US009280824B2

(12) United States Patent
Fukuda (10) Patent No.: US 9,280,824 B2
(45) Date of Patent: Mar. 8, 2016

(54) VEHICLE-SURROUNDINGS MONITORING DEVICE (75) Inventor: Hisaya Fukuda, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 455 days.

(21) Appl. No.: 13/498,958

(22) PCT Filed: Sep. 27, 2010

(86) PCT No.: PCT/JP2010/005801
§ 371 (c)(1),
(2), (4) Date: Mar. 29, 2012

(87) PCT Pub. No.: WO2011/039989
PCT Pub. Date: Apr. 7, 2011

(65) Prior Publication Data
US 2012/0182426 A1 Jul. 19, 2012

(30) Foreign Application Priority Data
Sep. 30, 2009 (JP) ................. 2009-226942

(51) Int. Cl.
H04N 7/18 (2006.01)
G06T 7/00 (2006.01)
G08G 1/16 (2006.01)

(52) U.S. Cl.
CPC .............. *G06T 7/0042* (2013.01); *G08G 1/165* (2013.01); *G08G 1/166* (2013.01); *G08G 1/168* (2013.01); *G06T 2207/30261* (2013.01); *G06T 2207/30264* (2013.01)

(58) Field of Classification Search
CPC ............ G06T 2207/30261; G06T 2207/30264
USPC ............ 375/240.16, 240.03, 240.25
See application file for complete search history.

(56) References Cited

U.S. PATENT DOCUMENTS 5,638,116 A * 6/1997 Shimoura et al. ............. 348/118
5,670,953 A * 9/1997 Satoh et al. ................... 340/903

(Continued)

FOREIGN PATENT DOCUMENTS

JP          7-77431 A    3/1995
JP       11-023291 A    1/1999

(Continued)

OTHER PUBLICATIONS

Meng, L. et al. "Errors caused by misalignment of the optical camera axis and the object surface in the DSCM" Tsinghua Univ. (Sci & Tech), vol. 46, No. 11 dated 2006.
Search Report issued in Chinese Patent Application No. 201080043133.7 dated Nov. 4, 2013.
International Search Report for PCT/JP2010/005801 dated Oct. 19, 2010.

*Primary Examiner* — Richard Torrente
(74) *Attorney, Agent, or Firm* — Pearne & Gordon LLP (57) ABSTRACT A camera-orientation estimation unit estimates the amount of change in camera orientation on the basis of vehicle speed changes obtained from a vehicle-information acquirer. A distance-information update decision unit decides, on the basis of the amount of change in camera orientation, whether to update distance information by computing new distance information in a distance-computation unit or to update distance information using distance information stored in a distance-information memory unit. If the distance-information update decision unit has decided to update distance information by computing new distance information, a display device displays distance information that the distance-computation unit computes from a real-time image. If the distance-information update decision unit has decided to update using past stored distance information, the display device displays past distance information read from the distance-information memory unit.

1 Claim, 7 Drawing Sheets

(56) References Cited

U.S. PATENT DOCUMENTS

| | | | |
|---|---|---|---|
| 6,265,991 B1* | 7/2001 | Nishiwaki et al. | 340/903 |
| 6,285,393 B1 | 9/2001 | Shimoura et al. | |
| 6,531,959 B1 | 3/2003 | Nagaoka et al. | |
| 2001/0053248 A1* | 12/2001 | Maeda | 382/165 |
| 2002/0134151 A1* | 9/2002 | Naruoka et al. | 73/291 |
| 2005/0001715 A1* | 1/2005 | Itoh et al. | 340/435 |
| 2006/0074549 A1 | 4/2006 | Takahashi | |
| 2006/0126899 A1* | 6/2006 | Nagaoka et al. | 382/103 |
| 2006/0209195 A1* | 9/2006 | Goto | 348/219.1 |
| 2009/0187333 A1* | 7/2009 | Mueller | 701/200 |
| 2011/0066343 A1* | 3/2011 | Ota et al. | 701/70 |
| 2012/0327233 A1* | 12/2012 | Imai et al. | 348/148 |

FOREIGN PATENT DOCUMENTS

| | | | |
|---|---|---|---|
| JP | 11-051645 A | | 2/1999 |
| JP | 2001-084497 A | | 3/2001 |
| JP | 2002-117392 A | | 4/2002 |
| JP | 2002-163641 A | | 6/2002 |
| JP | 2002-259995 A | | 9/2002 |
| JP | 2004012429 A | * | 1/2004 |
| JP | 2006-105640 A | | 4/2006 |
| JP | 3820874 B2 | | 6/2006 |
| JP | 3910345 B2 | | 2/2007 |

* cited by examiner

NUMERIC-VALUE UNITS: cm

VEHICLE-SURROUNDINGS MONITORING DEVICE

TECHNICAL FIELD

The present invention relates to a vehicle surroundings monitoring apparatus that calculates a distance to an obstacle in the area around a vehicle by means of a vehicle-mounted camera.

BACKGROUND ART

There is, as a conventional vehicle surroundings monitoring apparatus, a system in which a camera is mounted on a vehicle, and the distance to an obstacle presenting a risk of collision is detected from a captured image of the vehicle's surroundings. When a vehicle-mounted camera is used, in particular, it is important to be able to perform stable detection even in the event of changes in the camera's attitude, such as pitch (vertical rocking motion) due to the behavior of the vehicle.

Thus, a method is known whereby an attitude change amount is calculated by means of image processing using a road boundary line or vanishing point from an image captured by a camera, and is corrected (see Patent Literature 1 and 2).

Also, a method is known whereby a plurality of objects are extracted from an image obtained by a camera, an average value of displacement amounts of height-direction positions of these objects is calculated as pitch, and coordinates are corrected (see Patent Literature 3).

CITATION LIST

Patent Literature

PTL 1
Patent 2002-259995
PTL 2
U.S. Pat. No. 3,820,874
PTL 3
U.S. Pat. No. 3,910,345

SUMMARY OF INVENTION

Technical Problem

However, with a conventional vehicle surroundings monitoring apparatus, since a change in camera attitude due to pitch is corrected using the height of left and right road boundary lines and/or travel path width information, or vanishing point information calculated from left and right boundary lines, as in Patent Literature 1 and 2, boundary line information cannot be used and the influence of pitch cannot be eliminated when traveling along a road that has no boundary lines, and particularly in cases such as when there are no boundary lines as in a parking lot, or when a parking frame is marked but is essentially outside the imaging range of a rear camera. Also, a method whereby pitch is corrected by means of variation in object heights, without using boundary lines, as in Patent Literature 3, in principle the method requires a means of accurately measuring the distance to an object, and in Patent Literature 3 is explained in specific terms using a stereo camera apparatus. A stereo distance calculation apparatus with two in-line cameras has a large and complicated configuration, and requires very precise calibration between the cameras, resulting in a problem of high system cost and in-vehicle installation cost. Also, a problem when a moving object is mixed in with objects is that it is not possible to determine whether deviation is due to camera attitude pitch or to movement of an object, and correction cannot be performed accurately.

It is an object of the present invention to provide a vehicle surroundings monitoring apparatus that reduces the influence of distance error due to a camera attitude caused by the occurrence of pitch or the like, and enables the distance to an object to be displayed accurately.

Solution to Problem

A vehicle surroundings monitoring apparatus of the present invention is provided with: an imaging section that images a situation around a vehicle; a vehicle information acquisition section that detects vehicle speed; a camera attitude estimation section that calculates an attitude of a camera used by the imaging section based on vehicle speed obtained by the vehicle information acquisition section; a distance calculation section that calculates a distance to an object from an image captured by the imaging section and a change amount of a camera attitude estimated by the camera attitude estimation section; a distance information storage section that stores distance information calculated by the distance calculation section; a distance information update determination section that determines whether distance information is to be updated using distance information calculated by the distance calculation section or distance information stored in the distance information storage section based on a change amount of a camera attitude estimated by the camera attitude estimation section; and an output information generation section that generates output information in accordance with contents determined by the distance information update determination section.

Advantageous Effects of Invention

A vehicle surroundings monitoring apparatus of the present invention can estimate the influence on distance data of a camera attitude change such as pitch, and output the distance to an object accurately, through the provision of a distance information update determination section that determines whether distance information is to be updated using distance information calculated by a distance calculation section or distance information stored in a distance information storage section, based on a change amount of a camera attitude estimated by a camera attitude estimation section.

DESCRIPTION OF EMBODIMENT

Now, an embodiment of a vehicle surroundings monitoring apparatus of the present invention will be described with reference to the accompanying drawings.

Figure 1:
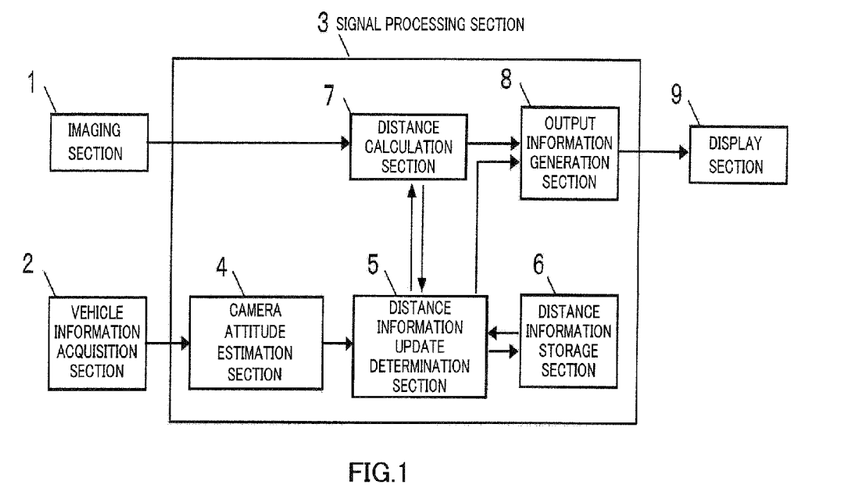
FIG. 1 is a block diagram showing the configuration of a vehicle surroundings monitoring apparatus according to an embodiment of the present invention.

FIG. 1 is a block diagram showing the configuration of a vehicle surroundings monitoring apparatus. Imaging section 1 images the situation around the vehicle, and vehicle information acquisition section 2 acquires the vehicle speed and so forth. Imaging section 1 has cameras using a CCD or CMOS camera, for example, a rear camera imaging the area of the rear of the vehicle, installed in the vicinity of the number plate or emblem on the rear of the vehicle or installed on the top of the vehicle, or side cameras imaging side areas of the vehicle installed on the side mirrors, and so forth. Vehicle information acquisition section 2 acquires, for example, a vehicle speed signal obtained from the vehicle, using an A/D conversion I/F in the case of an analog signal, and an I/F that acquires a CAN signal in the case of CAN information. In addition, illumination sensor information and a value of steering wheel steering angle may also be acquired as vehicle information.

Signal processing section 3 processes image data using image data captured by imaging section 1 and vehicle information acquired by vehicle information acquisition section 2, and outputs object distance information to display section 9. Signal processing section 3 comprises camera attitude estimation section 4, distance information update determination section 5, distance information storage section 6, distance calculation section 7, and output information generation section 8. Camera attitude estimation section 4 has vehicle speed acquired by vehicle information acquisition section 2 as input, and estimates a camera attitude from a change in vehicle behavior. Distance information update determination section 5 determines whether distance information is to be calculated from an image captured by imaging section 1 or distance information stored in distance information storage section 6 is to be used, based on an attitude status estimated by camera attitude estimation section 4. If distance information update determination section 5 determines that distance information is to be calculated from an image captured by imaging section 1, distance information storage section 6 stores distance information calculated by distance calculation section 7. Output information generation section 8 generates data using distance information calculated by distance calculation section 7, or distance information read from distance information storage section 6 as output information.

The operation of a vehicle surroundings monitoring apparatus configured as described above will now be explained.

Figure 2:
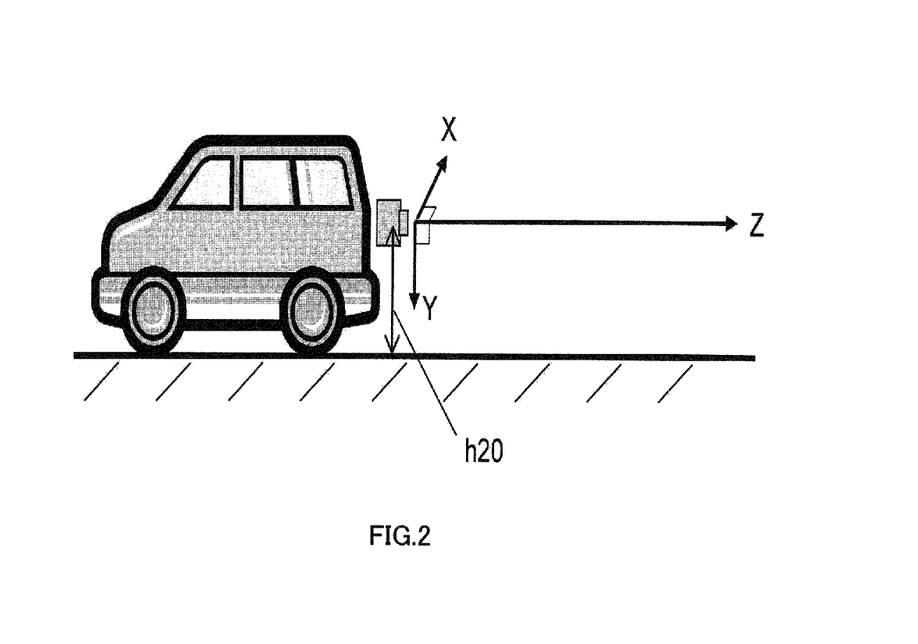
FIG. 2 is a drawing showing camera installation on a vehicle according to the above apparatus.

First, an example of camera installation on a vehicle and the distance data acquisition method will be described. FIG. 2 shows an example of camera installation on a vehicle, in which a camera is installed at height h20 above the road surface. With regard to the camera attitude, the rearward direction is positive in the front-back direction of the vehicle, the direction parallel to the ground is the Z axis (camera optical axis direction), the direction parallel to the ground and in the width direction of the vehicle with respect to the Z-axis direction is the X axis, and the direction vertically downward with respect to the Z axis is the Y direction.

Figure 3:
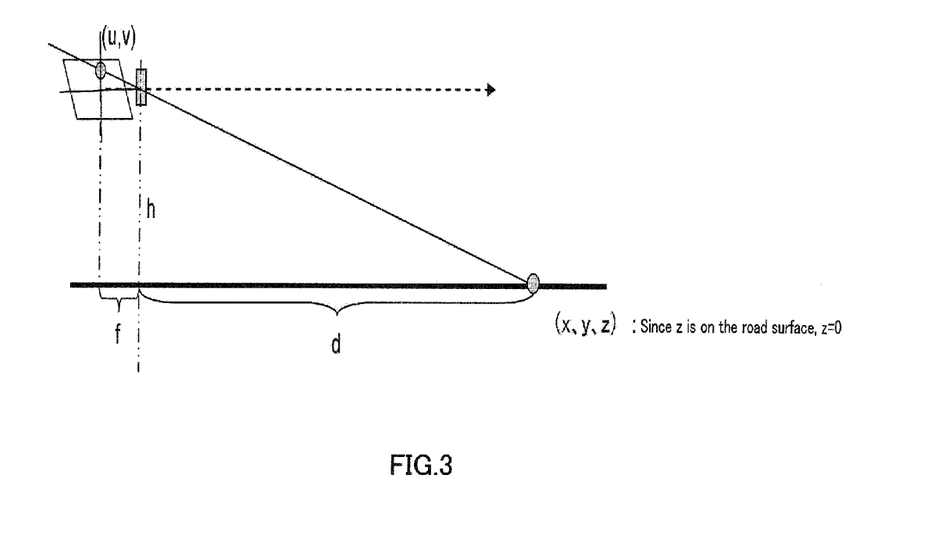
FIG. 3 is a drawing showing the relationship to the real world of a camera of the above apparatus.

As shown in FIG. 3, in the case of a camera installed on a vehicle in this way, if its installation conditions (height (h) above the ground, and optical axis direction) and camera characteristics (imaging element pixel spacing (iu,iv), focal length (f), and lens distortion correction data) are known, the following relationships hold true between captured image coordinates (u,v) and coordinates (x,y,z) of each point on the ground due to geometrical constraints of the optical system, and thereby a distance can be calculated.

$$u = f/iu \times x/h \quad \text{(Equation 1)}$$

$$v = f/iv \times y/h \quad \text{(Equation 2)}$$

Using this principle, distance data corresponding to coordinates in a captured image is held in a camera beforehand.

Figure 4:
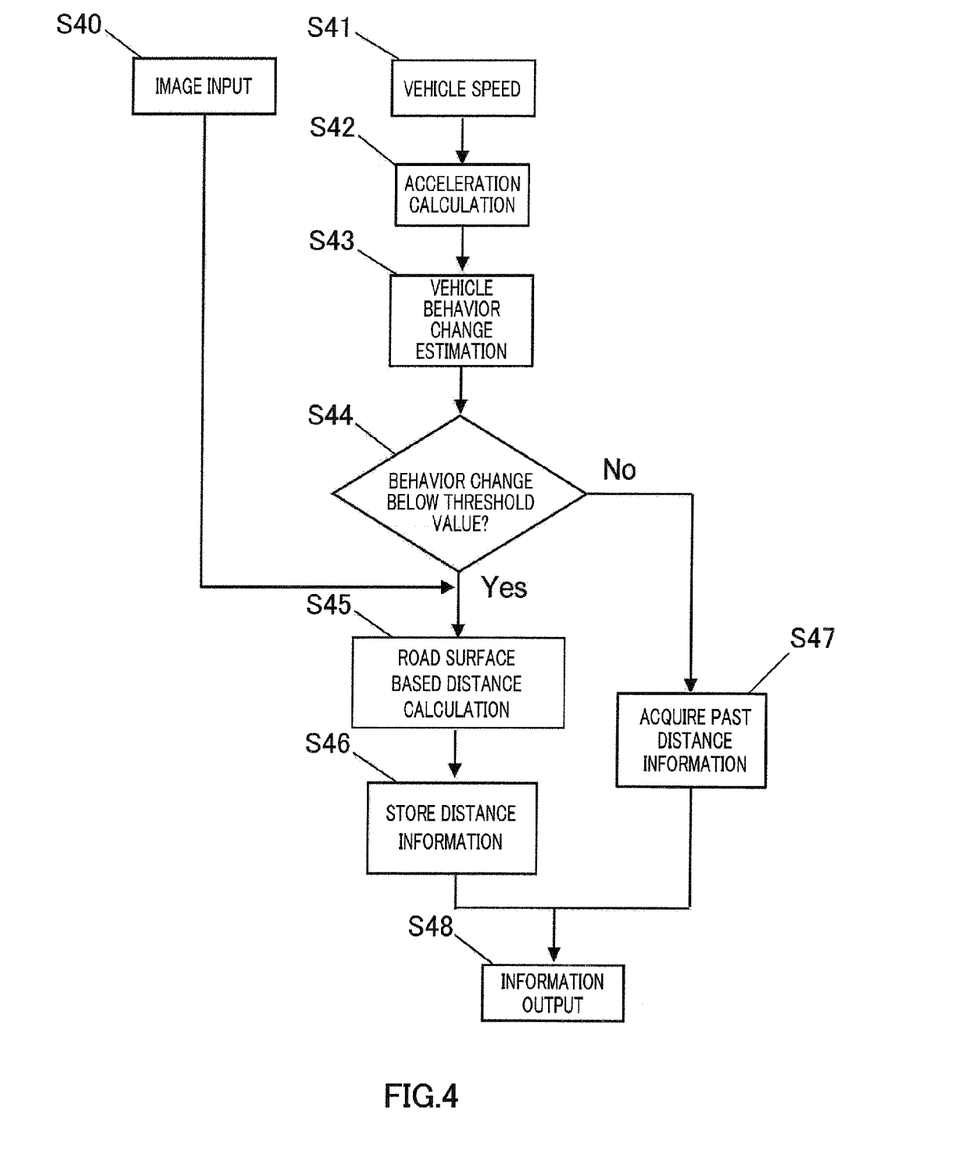
FIG. 4 is a flowchart for explaining the operation of the above apparatus.

FIG. 4 is a flowchart of signal processing in a vehicle surroundings monitoring apparatus of this embodiment.

When each round of this signal processing is executed, first, in step S40, signal processing section 3 reads new image data from imaging section 1, and stores this in memory together with the time of acquisition.

In step S41, vehicle information acquisition section 2 acquires the vehicle speed, and stores this in memory sequentially together with the time of acquisition.

In step S42, vehicle speed per unit time is found based on a time change from the time at which a distance was previously calculated, and acceleration is calculated.

In step S43, camera attitude estimation section 4 estimates change in vehicle behavior—that is, camera attitude—from the acceleration calculated in step S42. Change in vehicle behavior estimated from this acceleration will now be explained.

Figure 5:
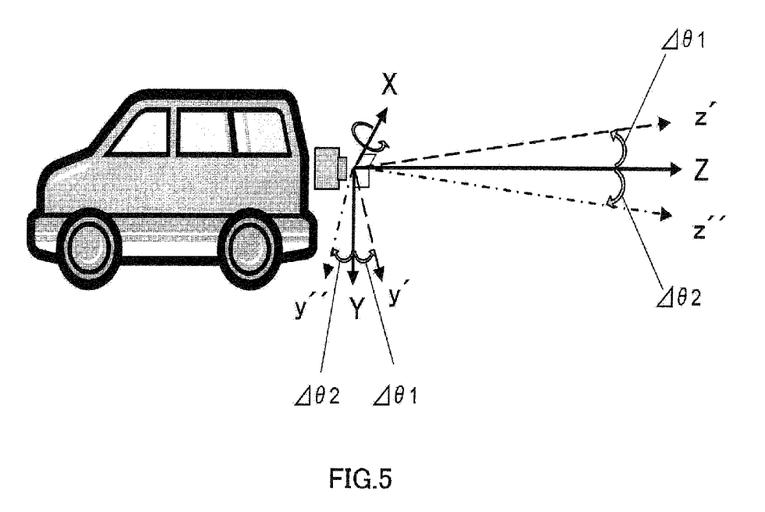
FIG. 5 is a drawing showing attitude change of a camera of the above apparatus.

FIG. 5 showing coordinate axes of a camera installed on a vehicle is an example in which the rearward direction is positive in the front-back direction of the vehicle, the direction parallel to the ground is the Z axis (camera optical axis direction), the direction parallel to the ground and in the width direction of the vehicle with respect to the Z-axis direction is the X axis, and the direction vertically downward with respect to the Z axis is the Y direction.

Generally, when vehicle acceleration is great, change in vehicle behavior is great, and, for example, when a vehicle accelerates, in terms of the camera attitude, there is a θ1 change about the X axis, and an inclination of the vehicle-traveling-direction Z axis in the z' direction (pitch in the + direction) and of the vertical-direction Y axis to y' respectively. Conversely, when the vehicle is slowed by braking or the like, there is a θ2 change about the X axis, and an inclination of the Z axis in the z" direction (pitch in the – direction) and of the vertical-direction Y axis to y".

Figure 6:
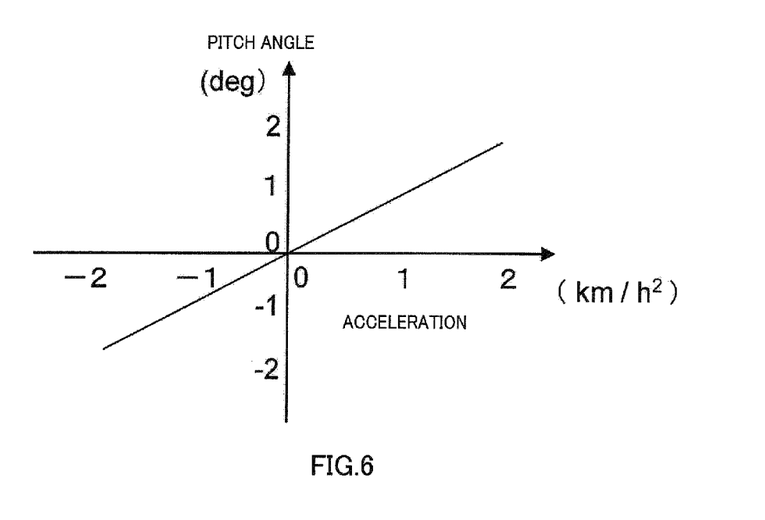
FIG. 6 is a drawing showing the relationship between vehicle acceleration and pitch angle change of camera attitude according to the above apparatus.

As values of vehicle behavior change amount, data may be prepared beforehand that relates vehicle acceleration to fluctuation amount of a pitch angle, as shown in FIG. 6. If acceleration is great and vehicle behavior fluctuates drastically, change in behavior per minute time period is also great, and it is difficult to calculate an accurate change amount of vehicle behavior corresponding to a camera's captured image without using another attitude sensor. Therefore, error is large in a distance measurement method that presupposes that the attitude of a camera installed on a vehicle with respect to the ground is known.

In step S44, if change in behavior is below a threshold value, based on the change amount of vehicle behavior estimated in step S43, distance information update determination section 5 proceeds to step S45 in order to calculate a distance from the image read in step S40, whereas if change in behavior is greater than or equal to the threshold value, distance information update determination section 5 determines that error will be large if a distance is calculated by means of image processing, and proceeds to step S47.

The threshold value may be selected by a user from among values of a pattern (ex. Lo: acceleration 0.5, Mid acceleration: 1.0, Hi: acceleration 1.5) set in ROM beforehand, or may be set beforehand taking vehicle weight and vehicle characteristics of suspension coils, dampers, and so forth, into consideration.

In step S45, distance calculation section 7 calculates the distance to an object captured in an image from the image read in step S40. In distance calculation, an edge of a part where an object touches the road surface is extracted by means of image processing, and calculation is performed for the position of that edge using imaging screen coordinates and relational expressions (1) and (2) for coordinates of points on the road surface according to geometrical constraints of the above-described optical system, and the pitch angle estimated in step S43.

In step S46, distance information storage section 6 stores image data acquired in step S40, change amount of the vehicle behavior estimated in step S43, and the distance calculated in step S45, together with time information.

In step S47, if distance information update determination section 5 has determined in step S44 that the vehicle behavior change is greater than or equal to the threshold value—that is, that error will be large if the distance to an object is calculated from an image—distance information storage section 6 acquires distance data stored when vehicle behavior change was small together with time information when distance data is stored.

In step S48, output information generation section 8 generates output information with distance information calculated in step S45 or distance information acquired in step S47 as vehicle-to-object distance information. Output information contents are divided and generated according to whether the output information is distance data calculated in real time or distance data estimated using past information.

Figure 7:
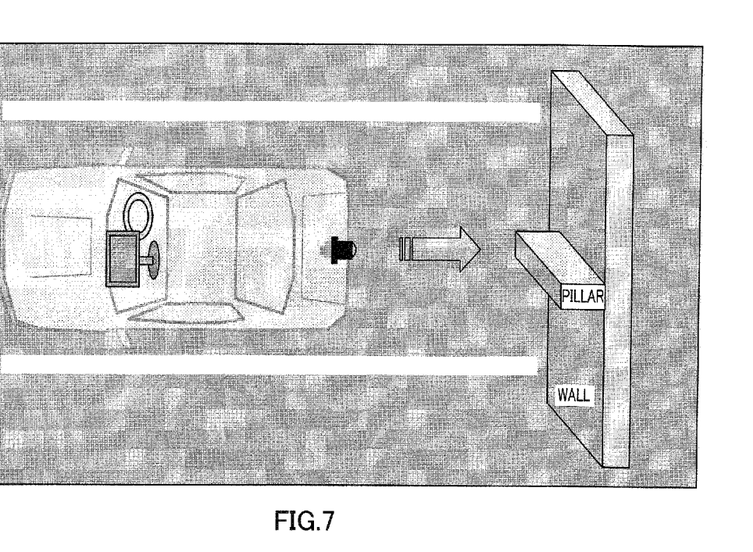
FIG. 7 is a drawing showing a traveling environment of a vehicle as related to the above apparatus.

Output information will be shown for a case in which a vehicle is moved backward in an environment in which there is a wall and pillar, as in FIG. 7.

Figure 8:
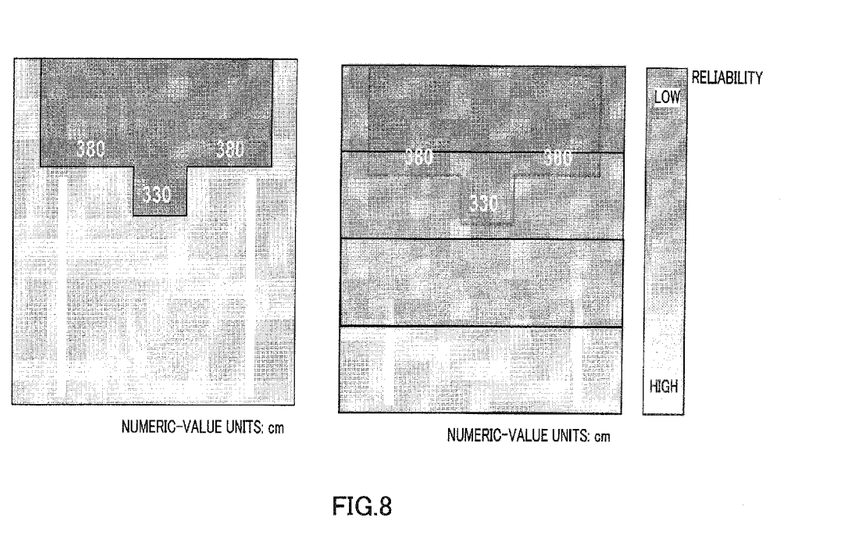
FIG. 8 is a drawing showing a distance data display of the above apparatus.

The left-hand drawing in FIG. 8 shows an example of a display when object distance information is calculated in real time. Since the distance is calculated from a captured image in real time, display section 9 displays the calculated distance to an object using a method whereby superimposition is performed on a display image.

The right-hand drawing in FIG. 8 shows an example of a display when error estimated from a behavior change amount at the time of distance calculation is also taken into consideration. Since, when pitch-direction fluctuation of camera attitude occurs due to vehicle behavior, error increases as the distance to an object increases, so that display section 9 performs display that takes reliability into consideration.

An example will now be given of a display when past distance information is used.

Figure 9:
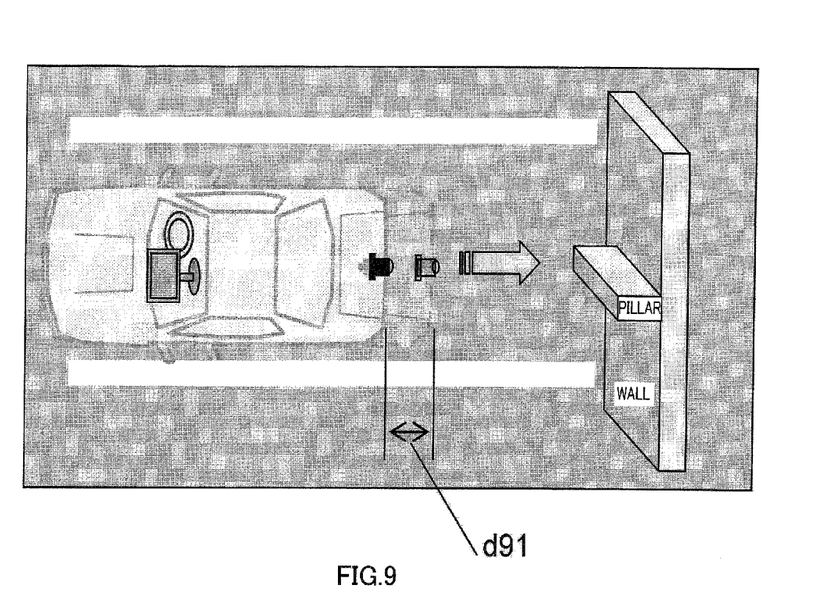
FIG. 9 is a drawing showing an amount of movement at the time of vehicle movement as related to the above apparatus.
Figure 10:
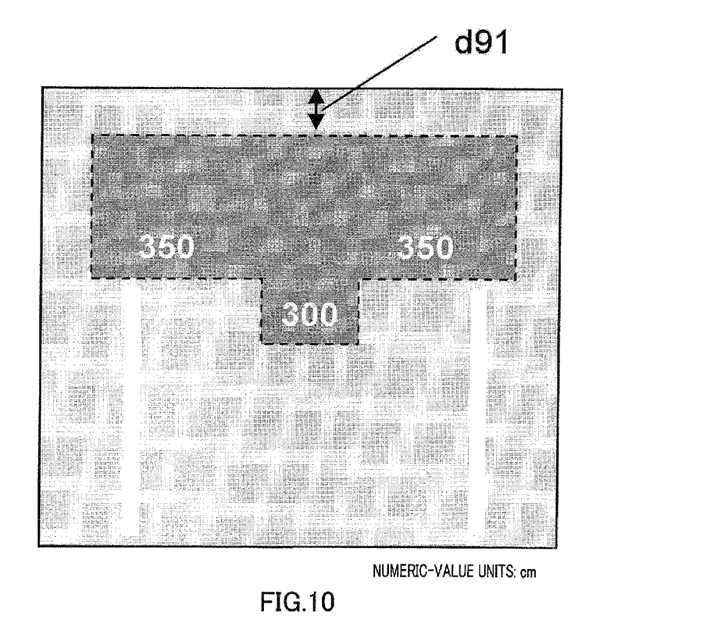
FIG. 10 is a drawing showing a distance data display using past stored information of the above apparatus.

First, in FIG. 9, with regard to past distance information, a vehicle movement amount from the time of distance data calculation to the current time, as indicated by reference code d91, is taken into consideration, and image data is shifted by vehicle movement amount d91 with respect to the left-hand drawing in FIG. 8, as shown in FIG. 10, and distance data for an object in the image is updated (in the example, by 30 cm relative to the state in FIG. 8). The movement amount can be obtained by integration by the amount of elapsed time of vehicle speed information acquired from vehicle information and stored in memory.

Figure 11:
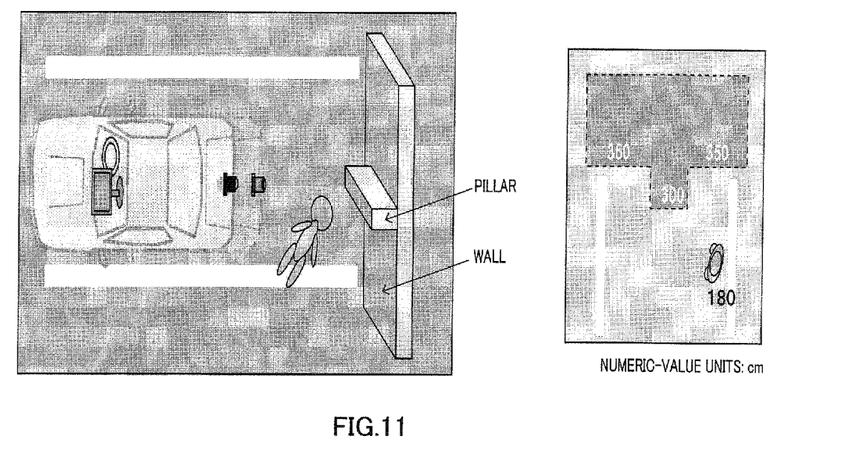
FIG. 11 is a drawing showing a case in which a new object approaches during vehicle movement as related to the above apparatus.
Figure 12:
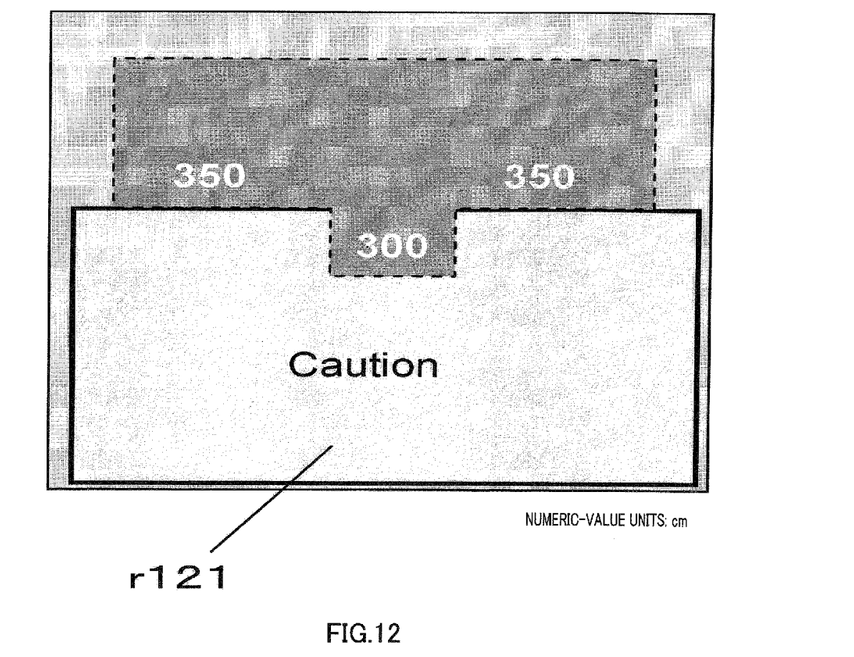
FIG. 12 is a drawing showing a distance data display using past stored information of the above apparatus when a new object approaches during vehicle movement.

Since this is not real-time information, object disappearance, the appearance of a new object, object movement, and so forth, must be taken into consideration. For example, if a moving object has approached between the distance data calculation time and the current time as shown in the left-hand drawing in FIG. 11, it is actually necessary to present the situation as shown in the right-hand drawing in FIG. 11, but since past image data is being used, information presentation to the user for such an approaching body is not possible. In order to give due consideration to the possibility of the presence of such a new obstacle, a display intended to draw attention specifically to the area between an object and vehicle is performed, as indicated by reference code r121 in FIG. 12.

In this embodiment, an example has been given in which pitch-direction behavior change is estimated from a change in vehicle speed, and it is determined whether or not the distance to an obstacle is to be calculated or past information is to be used as distance information, but a configuration may also be used whereby the same kind of effect is obtained by using a steering angle (a steering wheel rotation angle, or an angle calculated from left and right wheel pulses) as vehicle information, and change in a vehicle's roll-direction behavior is also considered.

According to a vehicle surroundings monitoring apparatus of an embodiment of this kind, distance information update determination section 5 estimates camera behavior change from vehicle speed change, and according to the amount of this change, determines whether the distance to an object is to be calculated in real time or distance data stored in the past is to be used, enabling the distance to an object to be calculated accurately.

The disclosure of Japanese Patent Application No. 2009-226942, filed on Sep. 30, 2009, including the specification, drawings and abstract, is incorporated herein by reference in its entirety.

INDUSTRIAL APPLICABILITY

As described above, a vehicle surroundings monitoring apparatus according to the present invention estimates the influence on distance data of a camera attitude change such as pitch, and has an effect of outputting the distance to an object accurately, through the provision of a section that determines camera attitude using vehicle information, and is suitable for use as a vehicle surroundings monitoring apparatus that calculates the distance from an obstacle in the area around a vehicle.

REFERENCE SIGNS LIST

1 Imaging section
2 Vehicle information acquisition section
4 Camera attitude estimation section
5 Distance information update determination section
6 Distance information storage section
7 Distance calculation section
8 Output information generation section
9 Display section

The invention claimed is:

1. A vehicle surroundings monitoring apparatus comprising:
   an imaging device that has a camera, the imaging device images a situation around a vehicle using the camera;
   a vehicle information acquirer that acquires a vehicle speed signal from the vehicle to obtain vehicle speed information;
   a camera attitude estimator that calculates acceleration of the vehicle based on the vehicle speed information, estimates a pitch angle representing change in vehicle behavior based on the calculated acceleration, and estimates an attitude of the camera to be the pitch angle;
   a distance calculator that extracts an edge of a part where an object touches the road surface, and calculates a distance to the object based on relationships between captured image coordinates and coordinates of each point on the ground wherein the relationships is determined from height above a ground, optical axis direction, and characteristics of the camera and the optical axis direction is calculated from the estimated attitude of the camera;
   distance information storage that stores distance information calculated by the distance calculator together with image data acquired by the imaging device and time information;
   a distance information update determiner that determines that distance information to the object is to be updated using distance information calculated by the distance calculator when a change amount of a camera attitude estimated by the camera attitude estimator is below a threshold value, and the distance information update determiner determines that distance information to the object is to be updated so as to shift the distance information previously stored in the distance information storage by a vehicle movement amount obtained from the vehicle speed information when the change amount of the camera attitude estimated by the camera attitude estimator is greater than or equal to the threshold value;
   an output information generator that generates output information to display an image containing the object and superimpose a distance to the object in accordance with contents determined by the distance information update determiner; and
   a display device that, when the distance information update determiner determines to update the distance information by shifting the previous distance information by the vehicle movement amount, displays a first image containing the object using the image data previously stored in the distance information storage, superimposes the distance to the object on the first image, and displays a second image representing a caution area between the object and the vehicle on the first image so that a driver notices a new obstacle that is not contained in the first image.

* * * * *